United States Patent [19]

Mohr

[11] Patent Number: 4,613,876
[45] Date of Patent: Sep. 23, 1986

[54] LASER RECORDING SYSTEM
[75] Inventor: Siegfried H. Mohr, Santa Clara, Calif.
[73] Assignee: NCR Corporation, Dayton, Ohio
[21] Appl. No.: 675,919
[22] Filed: Nov. 28, 1984
[51] Int. Cl.⁴ ............................................. G01D 15/14
[52] U.S. Cl. ................... 346/160; 346/136; 355/72; 400/658; 101/415.1
[58] Field of Search ............... 346/160, 107, 108, 136; 358/292, 302; 226/88, 58; 352/228; 101/415.1, 409; 271/315; 355/72, 75, 73, 76; 400/658, 623, 624

[56] References Cited

U.S. PATENT DOCUMENTS

| | | |
|---|---|---|
| 2,394,649 | 2/1946 | Young ................................ 358/292 |
| 3,154,371 | 10/1964 | Johnson . |
| 3,809,806 | 5/1974 | Walker et al. . |
| 3,874,621 | 4/1975 | Blair et al. . |
| 3,938,191 | 2/1976 | Jarmy . |
| 3,953,859 | 4/1976 | Locke . |
| 4,168,506 | 9/1979 | Corsover . |
| 4,271,415 | 6/1981 | Murakoshi et al. . |
| 4,285,012 | 8/1981 | Ohara et al. .......................... 346/108 |
| 4,293,864 | 10/1981 | Scott . |
| 4,358,774 | 11/1982 | Wilkinson . |

Primary Examiner—A. Evans
Attorney, Agent, or Firm—Wilbert Hawk, Jr.; Albert L. Sessler, Jr.; George J. Muckenthaler

[57] ABSTRACT

A recording system uses a laser beam for imaging the surface of a photographic film which is held in a curved arrangement to allow light to be focused in precise position in a circular light path on the film. The film is maintained in the curved arrangement by resilient means associated with a film holding curved platen.

16 Claims, 4 Drawing Figures

LASER RECORDING SYSTEM

BACKGROUND OF THE INVENTION

In the field of recording or imaging systems, the laser or optical maser has been used to provide high speed and high intensity operation. The laser amplifies light and radiates the amplified light in the form of a coherent, extremely high intensity light beam. The light beam may be modulated or controlled in a manner wherein an image is recorded on a film or like record media in a scanned light pattern of a succession of lines. It is generally desired to improve the laser scanning or imaging technique in these systems.

Representative documentation in the field of recording or imaging systems includes U.S. Pat. No. 3,154,371, issued to W. R. Johnson on Oct. 27, 1964, which discloses an optical recording system utilizing a laser light source, a rotating reflector, a curved platen to correct for geometric distortions of the scanning beam and vacuum pressure exerted at the surface of the platen to hold the film strip secure in a desired plane.

U.S. Pat. No. 3,809,806, issued to R. Walker et al. on May 7, 1974, discloses film recording apparatus having a laser, a beam expander, a lens, a rotating reflector and a curved bridge member for supporting the film.

U.S. Pat. No. 3,874,621, issued to L. R. Blair et al. on Apr. 1, 1975, discloses a recording system using a gas laser along with a curved air film platen with small air jets providing an air bearing.

U.S. Pat. No. 3,938,191, issued to H. I. Jarmy on Feb. 10, 1976, discloses a read head carriage which is supported on air bearings and is driven by a precision lead screw.

U.S. Pat. No. 3,953,859, issued to J. W. Locke on Apr. 27, 1976, discloses apparatus for recording images on film by using a laser beam, a film transport clamped to a carriage and having an arcuate-surface platen with a vacuum box to provide suction for holding the film.

U.S. Pat. No. 4,168,506, issued to S. I. Corsover on Sept. 18, 1979, discloses a curved film guide to position the film during both recording as well as reading mode and having curved, porous surfaces through which air is passed to support the film.

U.S. Pat. No. 4,271,415, issued to M. Murakoshi et al. on June 2, 1981, discloses a laser COM device having a platen which is adapted to clamp the film between first and second pairs of rollers.

U.S. Pat. No. 4,293,864, issued to R. D. Scott on Oct. 6, 1981, discloses a laser scanner transport having a translation motor to move a modulated laser beam back and forth inside a transparent cylinder, and a spinner motor to cause rotation of the beam to describe a helical pattern on the cylinder and the printing medium thereon.

And, U.S. Pat. No. 4,358,774, issued to R. L. Wilkinson on Nov. 9, 1982, discloses a recording system which utilizes a write laser and a read laser and control means for maintaining proper focus of the laser beam.

SUMMARY OF THE INVENTION

The present invention relates to recording systems. More particularly, the present invention relates to a recording system utilizing a laser beam which is caused to be directed at a scanning spot in a defined circle of light or circular light path and wherein microimages are generated in successive line or raster manner to create a pattern on a film or like record media. The laser beam is modulated or controlled in response to electronic input signals, and beam focusing lenses direct the light at a precise location or spot on a scanning mirror which is rotated in a circular path by means of a variable speed driver. The laser beam is then directed by the rotating mirror at 90 degrees, or normal to the initial axial direction of the beam, through the beam focusing lenses and onto the film. The film is supported on a curved platen and is spring loaded or held in a precise and firm position thereon, and the platen is caused to be moved axially relative to the circular light path for recording successive lines of data on the film.

In view of the above discussion, the principal object of the present invention is to provide an improved recording system which utilizes a laser light source caused to be directed to a circular spot for recording an image on record media in successive line manner.

Another object of the present invention is to provide a recording system utilizing a laser beam scanner for imaging a pattern on film or like record media.

An additional object of the present invention is to provide precise means for holding record media and for moving the media along a path for recording data in successive line manner.

A further object of the present invention is to provide a laser record or read system to image a pattern on dry silver film which is precisely held in curved or arcuate manner for receiving a beam of light focused in the form of a circular path.

Additional advantages and features of the present invention will become apparent and fully understood from a reading of the following description taken together with the annexed drawing.

DESCRIPTION OF THE PREFERRED EMBODIMENT

Figure 1:
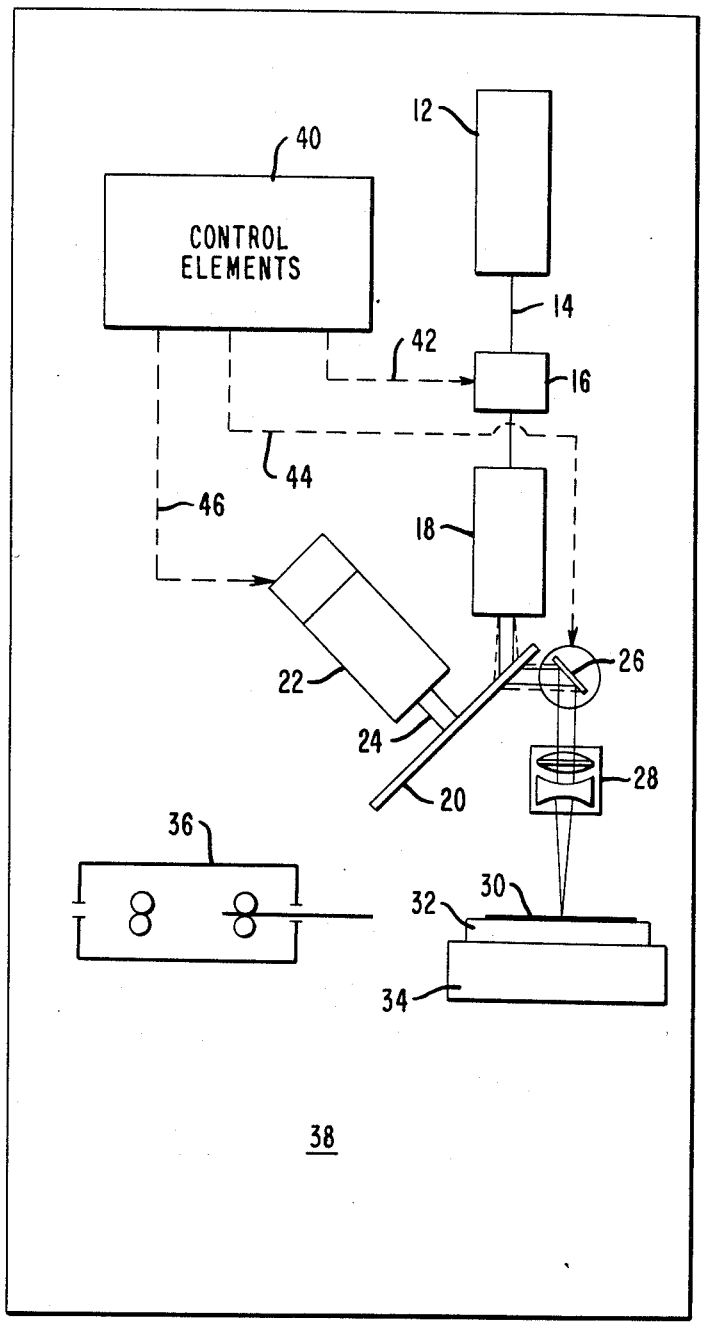
FIG. 1 is a schematic diagram of an electro-optical-mechanical system for micrographic generation of images.

FIG. 1 illustrates a diagram of components of a typical or universal type research tool for laser recording of microimages in a recording system and includes a laser 12 directing a beam of light 14 to an acousto-optic laser light modulator 16. The light beam is projected through a beam expanding telescope 18 and then onto a ten-faceted hologon scanner disk 20 driven by an electric motor 22 through a shaft 24 for providing X-deflection of the light beam. The light beam is then directed to a galvanometer mirror 26 for providing Y-deflection and the beam is further directed through an f-$\theta$ lens 28 for flat field and linear speed scanning of the focused spot and image display. The light beam is spot focused onto a film 30 supported on a film holder 32. An X-Y camera 34 may be an option associated with the film holder 32, and a manual type film processor 36 may also be positioned adjacent the film holder 32 for processing the film 30, all of the above described equipment being operably associated with or supported on an optical breadboard table 38 or like supporting structure. A block or board 40 of electronic control elements is connected or coupled by lines 42, 44 and 46 to the modulator 16, the mirror 26 and the motor 22, respectively.

Figure 2:
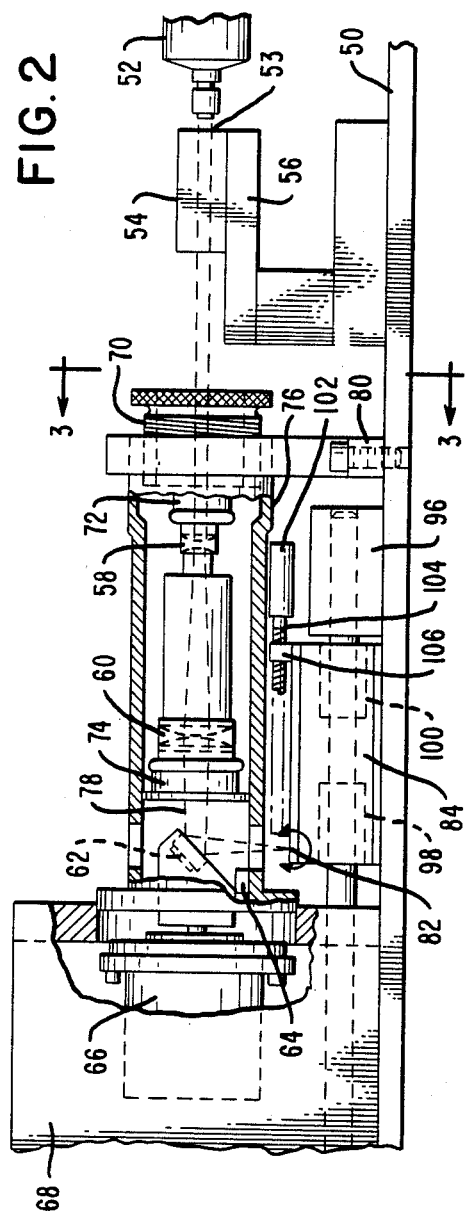
FIG. 2 is a side elevational view of a recording station incorporating the subject matter of the present invention.

FIG. 2 illustrates an imaging or recording system supported on an optical breadboard mounting base 50 and including a 1.5 mW laser 52 of the helium-neon type suitably positioned and directing a beam of light 53 to an acousto-optic laser light modulator 54 supported from a mounting base 56. The light beam 53 is directed along an initial path and passes through a bi-concave beam expanding lens 58 and then through two plano-convex beam focusing lenses 60 and to a monofacet scanning mirror assembly 62. The mirror assembly 62 is provided with a scanner balance weight 64 and the scanning mirror assembly is mounted on a hysteresis-synchronous motor 66 of variable speed range from 1800–7200 revolutions per minute, the motor being enclosed by a motor housing 68.

An optical mount focusing tube 70 has lens retainers 72 and 74 on respective sides of the lens 58 and the lens 60 and the tube includes a focusing male threaded portion. An outer optical tube 76 with a focusing female threaded portion includes angled slots for the laser cone of light 78 to be directed to a medium for recording the image, or the cone of light may be directed to an upper position for reading the image. The optical tube 76 carries the light beam 53 in axial manner and is supported from an optics assembly outrigger support bracket 80 seated on the mounting base 50.

Figure 3:
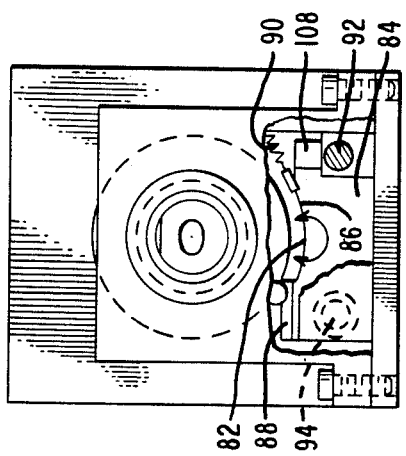
FIG. 3 is a view taken on the line 3—3 of FIG. 2.

The laser cone of light 78 is directed by the scanner mirror 62 to a focused spot 82 of light on a curved platen 84, as seen in FIGS. 2 and 3, and which platen is designed in the form as an arc of a circle and holding a film 86 or like record media. The curved platen 84 includes a film edge stop plate 88 and a spring 90 for precisely holding the film 86 on the curve of the platen and against the stop plate.

The structure includes a pair of linear guide rods 92 and 94 positioned generally under the optical tube assembly 76 on a guide rod support block 96 (FIG. 2) and extending into and fastened in the motor housing 68. The platen 84 is carried by means of linear low-friction bushings 98 and 100 which ride on the guide rods 92 and 94, and the curved platen 84 is axially movable by means of a linear, variable-speed, drive motor 102. The drive motor 102 is directly connected to a lead screw 104 and secured with a lead nut 106. A bearing 108 (FIG. 3) is associated with the platen 84 and rides on the right-hand linear guide rod 92.

Figure 4:
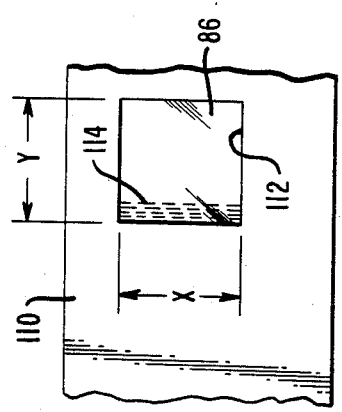
FIG. 4 is a representation of a plurality of image lines in raster form film media.

FIG. 4 shows a portion of a card 110 having an aperture 112 therein and wherein the aperture contains the film 86 on which is shown an image in the form of a plurality of lines 114 in a multi-raster scan arrangement. The X-direction indicates the scan line length as produced by the rotating scanner or disk 62, and the Y-direction is shown as a deflection produced by motion of the film 86 along the axial path of the curved platen 84.

It is thus seen that herein shown and described is a system for recording data or information on record media by use of a laser light source and directing the beam of laser light onto film held on a curved platen for effecting a circular light path for imaging a pattern on the film. A film stop member is secured at one side of the curved platen and a spring at the other side of the platen maintains the film in precise position in curved manner and against the stop member. The apparatus of the present invention enables the accomplishment of the objects and advantages mentioned above, and while a preferred embodiment of the invention has been disclosed herein, variations thereof may occur to those skilled in the art. It is contemplated that all such variations not departing from the spirit and scope of the invention hereof are to be construed in accordance with the following claims.

I claim:

1. A recording system comprising
   means for providing radiant energy of high intensity,
   means for modulating the radiant energy,
   means for focusing the radiant energy in position along an initial path axially of the direction of radiant energy emission and onto a record medium disposed to receive the focused radiant energy,
   means comprising a rotatable scanning mirror for directing the focused radiant energy from the axial path transversely onto the record medium,
   curved platen means for holding the record medium in arcuate manner so as to receive the radiant energy in spot form and in line manner across the surface of the record medium, said platen means including stop means comprising a plate secured to the curved platen means at one side thereof and providing an abutment for the record medium, and resilient means comprising a spring for urging the record medium in curved form and against the stop means abutment plate with a force that is predominantly in a direction parallel to the surface of the recording medium, thereby securing the recording medium in a fixed position relative to said curved platen means, and
   means for moving the platen means in the direction axially along the path of the radiant energy for recording images in line-by-line manner on the record medium.

2. The recording system of claim 1 wherein the radiant energy producing means is a laser.

3. The recording system of claim 1 wherein the modulating means is an acousto-optical laser light modulator.

4. The recording system of claim 1 wherein the radiation produced by the radiant energy producing means is a beam of light and the focusing means includes a beam expanding lens and a plano-covex focusing lens.

5. The recording system of claim 1 wherein the radiant energy directing means is a rotatable monofacet scanning mirror assembly.

6. The recording system of claim 1 wherein the radiation produced by the radiant energy producing means is a source of light and the directing means positions a beam in a circular light path onto the record medium.

7. The recording system of claim 1 wherein the record medium is a photographic type film.

8. The recording system of claim 1 wherein the means for moving the platen means include a pair of linear guide rods and lead screw means for moving the platen means therealong.

9. In an apparatus for recording images on record media by means of radiant energy directed along a prescribed path, means for moving the record media in a direction parallel with said path, and rotatable scanning means for directing the radiant energy transversely from the prescribed path and onto the surface of the record media, the improvement comprising
   curved plated means for supporting the record media, stop means comprising a plate secured to the curved platen means and positioned at one side of the platen means, and resilient means comprising a spring engageable with the record media and urging thereof against the stop means plate with a force that is predominatly in a direction parallel to the surface of the record media, thereby securing the record media in a fixed position relative to said curved platen means.

10. In the apparatus of claim 9 wherein the record media is a photographic-type film.

11. In the apparatus of claim 9 wherein the radiant energy is a laser source of light.

12. In the apparatus of claim 9 wherein the radiant energy transversely directing means is a rotatable monofacet scanning mirror assembly.

13. In the apparatus of claim 9 including means for modulating the radiant energy.

14. A recording system comprising a gas laser for producing a laser beam,
a modulator through which the laser beam is focused,
a rotatable scanning mirror onto which the modulated laser beam impinges and is then directed perpendicular to the path of the beam from the laser, and
curved platen means onto which the modulated laser beam is focused by the scanning mirror and for holding a film in the focused position, the platen means including stop means comprising a plate secured at one side of the curved platen means, and resilient means comprising a spring at the opposite side of the curved platen means for urging the film in curved manner and against the stop means plate with a force that is predominantly in a direction parallel to the surface of the film, thereby securing the film in a fixed position relative to said curved platen means.

15. A method of recording photographic images on film by scanning the film in a raster pattern with a spot produced by focusing onto the film a rotatably oriented beam of light which is modulated in accordance with data defining an image to be recorded, the method comprising the steps of
advancing the film longitudinally while traversing the spot across the film cyclically to define successive lines of the raster pattern, and
holding the film in curved arrangment against stop means to provide a circular light path for the spot on the surface of the film, the film being firmly held with resilient means urging the film against the stop means and in the curved arrangement for precise recording of images on the film, said urging being in a direction that is predominantly parallel to the surface of the film.

16. Apparatus for recording photographic images on film by scanning the film in a raster pattern with a spot of light by focusing a laser beam which is modulated in accordance with data defining an image to be recorded, the apparatus comprising
means for advancing the film longitudinally along a path parallel with the laser beam,
rotatable scanning means for focusing the laser beam onto the surface of the film in cyclical manner to define successive lines of the raster pattern,
curved platen means including stop means comprising a plate secured at one side of the platen means for holding the film in position to provide a circular light path for the spot on the surface thereof, and
resilient means comprising a spring associated with the curved platen means for urging the film against the stop means plate and for maintaining the film in precise position for recording of images thereon, said urging being in a direction that is predominantly parallel to the surface of the film.

* * * * *